Sept. 5, 1950      A. P. NEYHART      2,521,667
COMBINED CAMERA AND INDICIA RECORDING MEANS
Filed Dec. 11, 1944      5 Sheets-Sheet 1
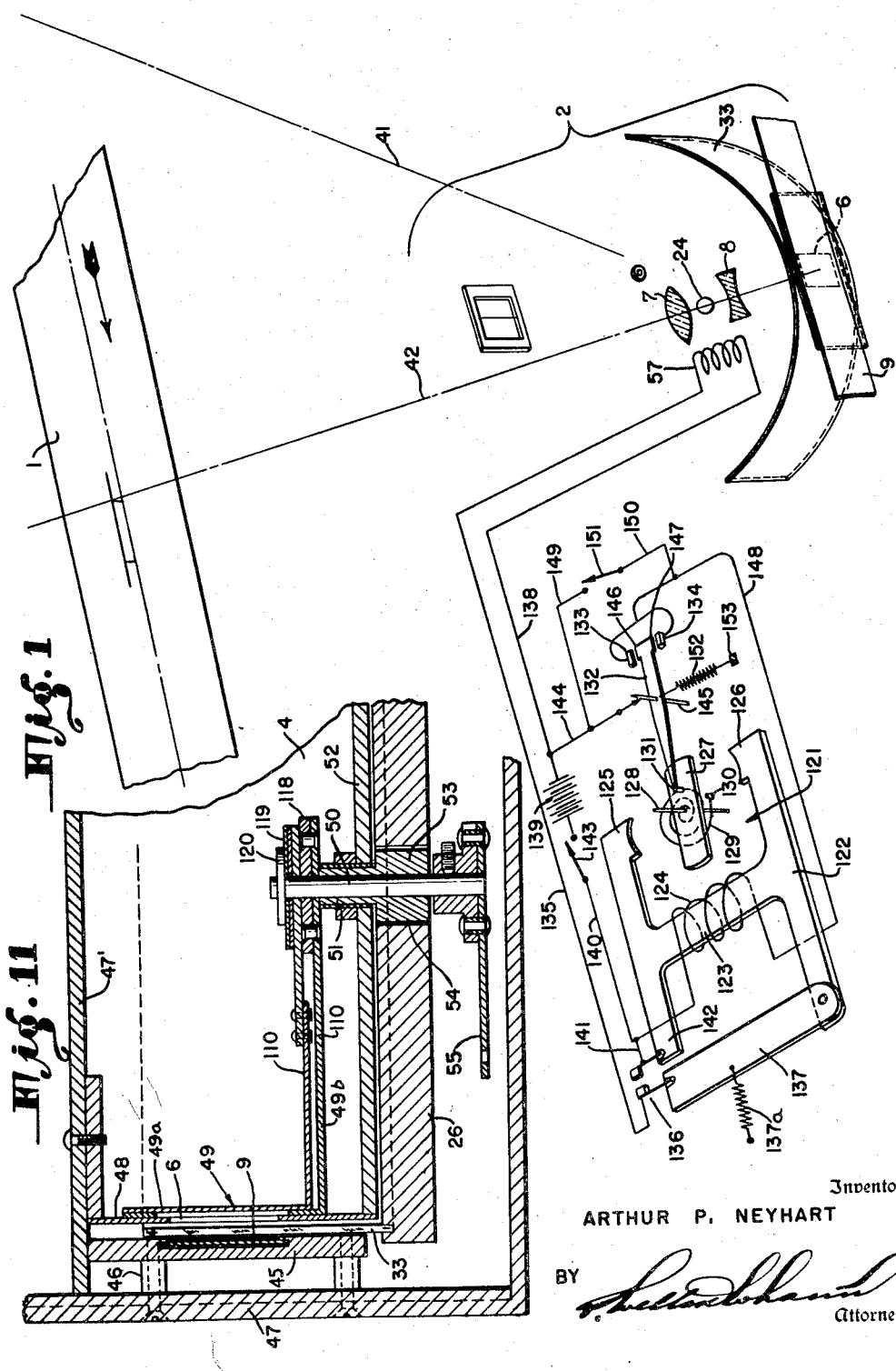
Inventor
ARTHUR P. NEYHART
BY
Attorney

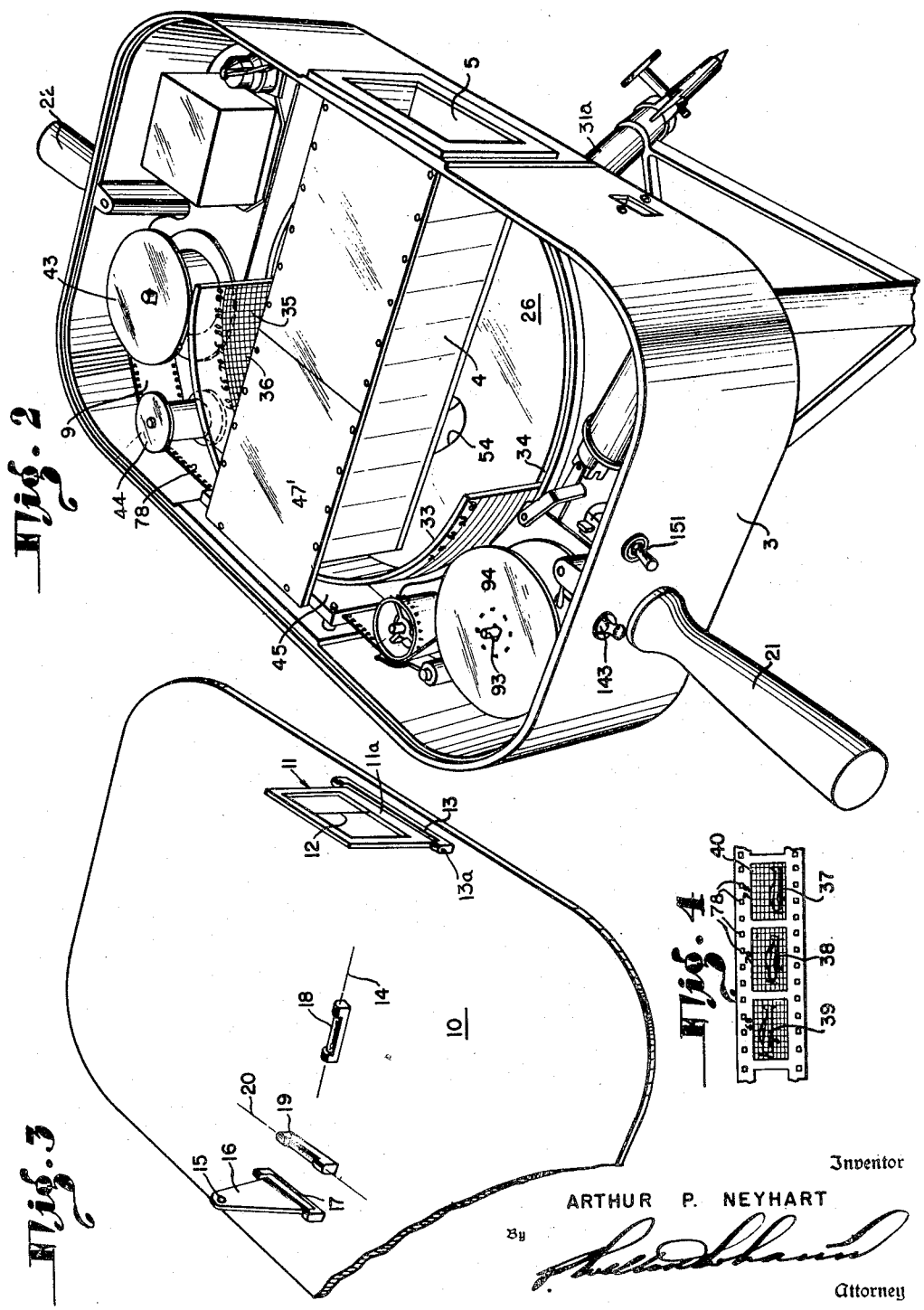

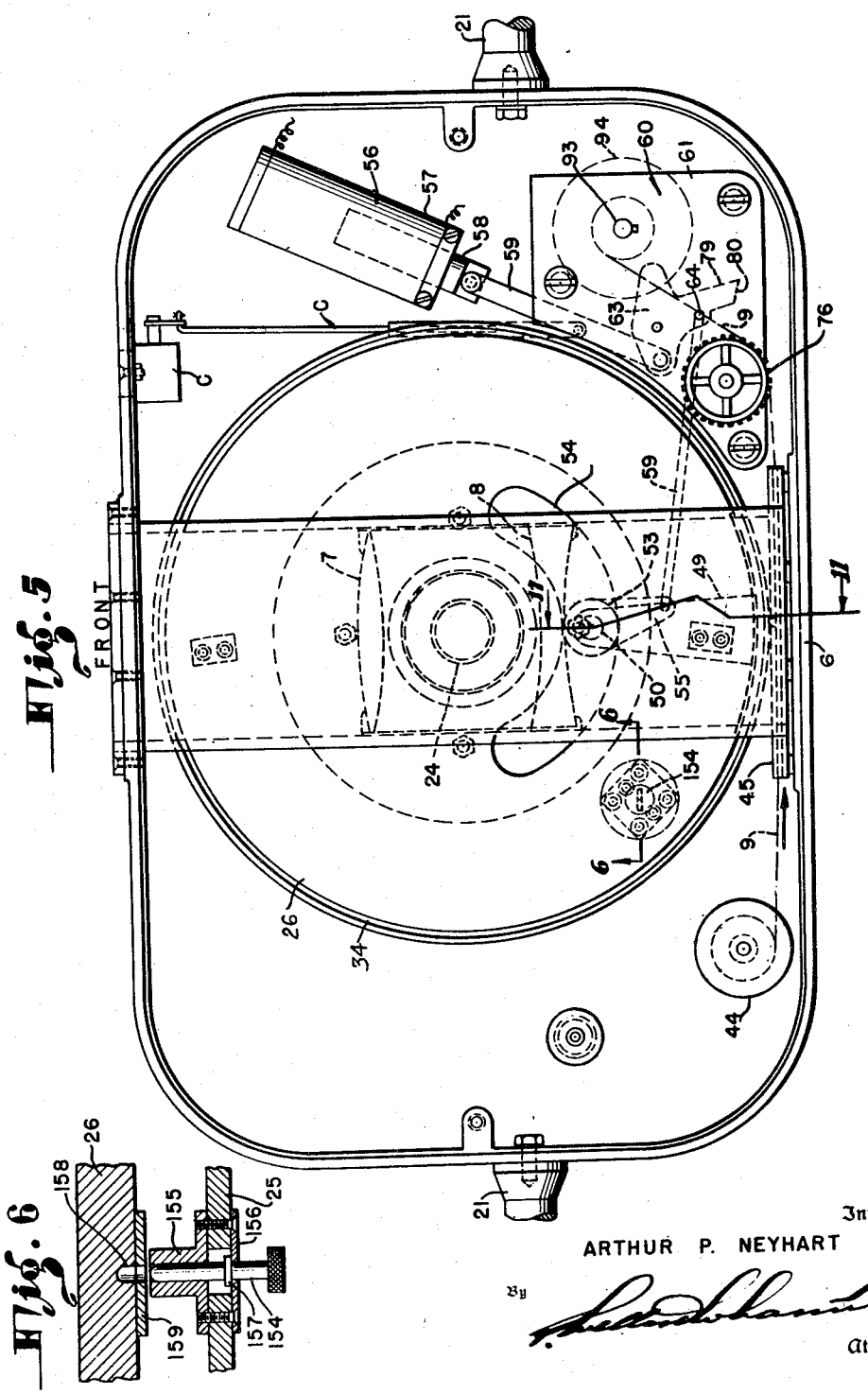

Sept. 5, 1950  A. P. NEYHART  2,521,667
COMBINED CAMERA AND INDICIA RECORDING MEANS
Filed Dec. 11, 1944  5 Sheets-Sheet 4

Inventor
ARTHUR P. NEYHART
By
Attorney

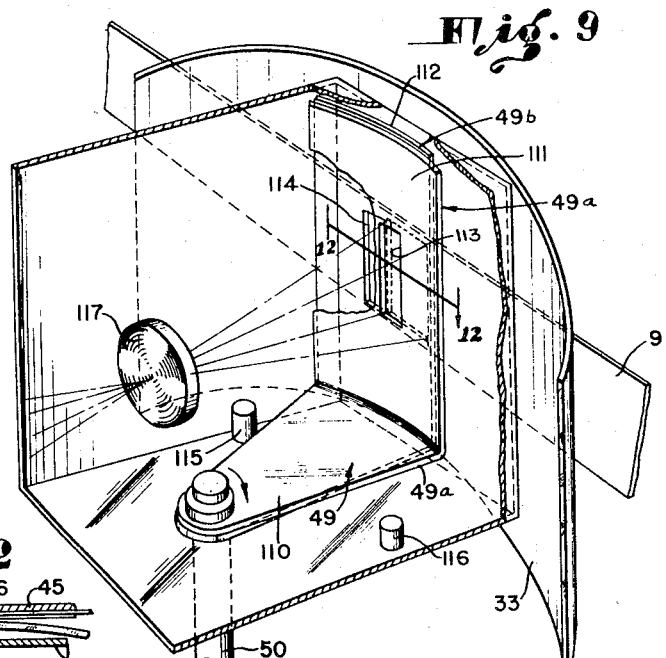
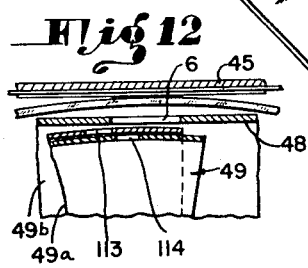

Patented Sept. 5, 1950

2,521,667

UNITED STATES PATENT OFFICE 2,521,667

COMBINED CAMERA AND INDICIA RECORDING MEANS

Arthur P. Neyhart, Los Angeles, Calif., assignor to Douglas Aircraft Company, Inc., Santa Monica, Calif., a corporation of Delaware Application December 11, 1944, Serial No. 567,641

7 Claims. (Cl. 346—107)

This invention relates to a method and apparatus for observing the performance of aircraft in flight and is expected to have its greatest usefulness in producing a record of the performance of an aircraft in taking off from a runway.

A principal object of the invention is to provide efficient apparatus and a simple method for producing a chart or record indicating the change in altitude of an aircraft as it leaves the runway and rises to higher levels for regular flight and which will carry indications which will enable the altitude of the aircraft to be readily computed. In this way the character of the take off can be studied to ascertain whether the gain in the elevation is gradual, regular or irregular.

Another object of the invention is to provide a simple apparatus and method for obtaining a succession of pictures of the craft on which reference lines are employed which will indicate the position of the aircraft on the length of the runway, as well as indicating its elevation above the runway, or at least having indications from which these factors can be computed.

A further object of the invention is to provide apparatus of simple construction providing means for taking a succession of timed pictures on a film and to facilitate the camera being held at all times in a level position so that it is capable of being readily oriented on a fixed axis so as to maintain the aircraft under observation within the field of view of the apparatus.

Another object of the invention is to provide simple means for controlling the feeding movements and exposure of the film in taking the series of pictures that can be made with the apparatus.

Further objects of the invention will appear hereinafter.

The invention consists of an efficient method and apparatus for charting aircraft flight.

In the drawings,

Fig. 1 is a view illustrating diagrammatically the relation of the apparatus to the runway from which the aircraft takes off and this view illustrates also diagrammatically a circuit arrangement for controlling the operation of the shutter and the timing of the successive exposures.

Fig. 2 is a perspective of the apparatus with the cover removed and showing the general arrangement of the elements of the apparatus that are mounted within its casing.

Fig. 3 is a perspective illustrating the cover of the casing of the apparatus removed from the body of the casing and illustrating the elements that are carried on the upper side of this cover and which cooperate in the functioning of the apparatus. In this view a corner of the cover is broken away.

Fig. 4 is a view illustrating a short section of the film which has been produced in accordance with this method and employing this apparatus. This film section shows three successive pictures taken with a time interval between them and indicating how an airplane gained elevation while these three pictures or "frames" were being taken.

Fig. 5 is a plan of the apparatus with the cover removed and indicating elements of the apparatus, some of which are shown in full lines and some of which are shown in dotted lines. In this view the handles at the end of the casing are represented as being broken away.

Fig. 6 is a fragmentary view and is a vertical section upon an enlarged scale, taken about on the line 6—6 of Fig. 5.

Fig. 9 is a perspective view of the shutter with certain parts broken away and shown in section and showing its relation to the light aperture and the frame that is fed past the aperture.

Fig. 10 is a view illustrating the mounting for the instrument shown partly in elevation and partly in section. This view partly illustrates means for leveling up the support for the instrument to enable it to be oriented on a substantially vertical axis.

Fig. 11 is a fragmentary vertical section taken about on the line 11—11 of Fig. 5 passing through the light aperture, further illustrating details of the means for operating the shutter. This view omits the film guide but indicates the position of the film with relation to the light aperture.

Figure 7:
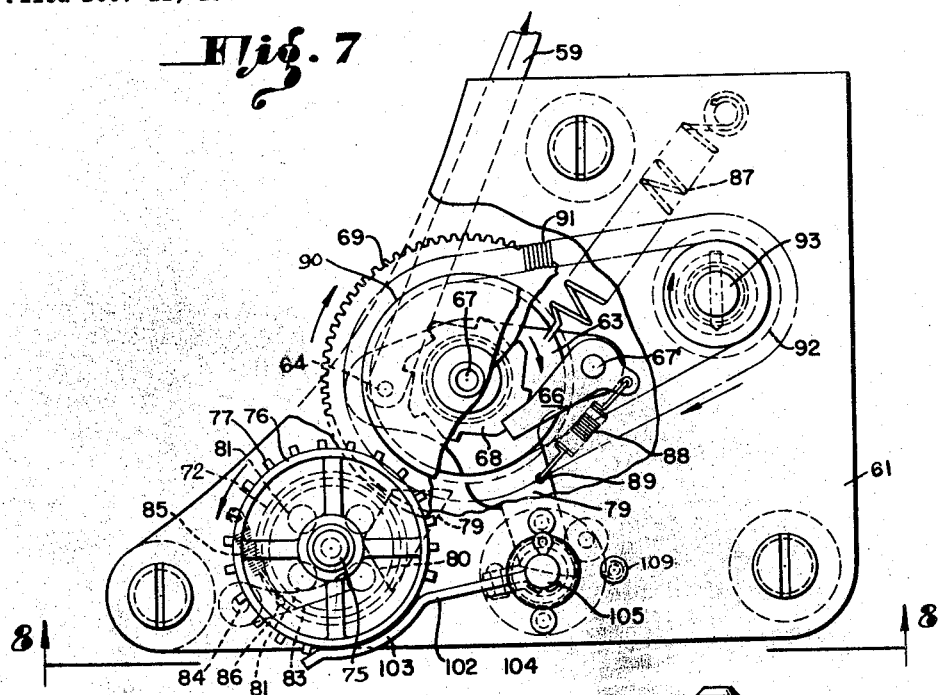
Fig. 7 is a detail plan view showing a portion of the feeding apparatus for the film and the means for controlling the operation of the shutter. In this view a portion of the upper frame plate is broken away and a certain pulley and gear wheel which are in vertical alignment with each other are also broken away so as to disclose parts of the apparatus located below them.

Fig. 12, which is a fragmentary view, is a horizontal section taken about on the line 12—12 of Fig. 9, further illustrating details of the shutter.

In the drawing I have illustrated this invention as applied to apparatus for making a record of the performance of an airplane in taking off from a runway or field, which record can be employed to prepare a chart indicating the rate at which a plane gains altitude as it rises from the runway.

In Fig. 1 I illustrate diagrammatically the relation of the apparatus or instrument to the runway 1, and I also illustrate diagrammatically a wiring arrangement which may be employed, including a timing device that determines the time interval between the "shots," exposures, or pictures that are taken in succession as the airplane rises from the runway.

In Fig. 1 the assembly of parts at 2 represents apparatus which includes a camera or pantoscope that, in the present instance, is embodied in a casing 3 (see Fig. 2). This casing in the present instance is of substantially rectangular form and includes a light-proof transverse box or light tunnel 4, that extends in a front and rear direction in the camera casing 3, presenting its forward open end 5 toward the airplane, the flight of which is to be observed; and, as indicated in Fig. 11, the rear end of this light tunnel is formed with a light aperture 6 through which rays of light are focused by a photographic objective comprising a pair of lens elements 7 and 8. The two lens elements are properly spaced with reference to each other, along the axis of the light tunnel so as to properly focus the light rays gathered by the objective onto a light-sensitive film 9 that is fed with a step-by-step movement past the light aperture 6.

In order to enable the instrument to be maintained sighted on the airplane as it runs along the runway and takes off from the same, I prefer to provide the camera casing 3 with a cover 10 (see Fig. 3) which carries a view finder. If desired, this finder may comprise a front element 11 in the form of a small rectangular frame with a vertical or hairline wire 12 extending across this frame. One edge of this frame may be pivotally mounted on a small bracket 13 so as to enable the element to be folded down flat on the cover or top 10 when the instrument is not in use. The rear element of the finder is mounted adjacent the rear edge of the cover 10 in line with the front and rear axis indicated by the line 14, and comprises peep-hole or sight opening 15 formed in the upper end of a small plate 16, the bottom edge of which is pivotally mounted in a bracket 17 to enable the plate to be folded down when not in use.

In order to insure that the camera will be in a substantially level position when in use, I may provide the cover 10 with two spirit levels 18 and 19, the former of which is located on the front and rear axis 14, the other level being mounted on a transverse axis 20 disposed at right angles to the front and rear axis 14. There is also provided means for adjusting the level of the camera to level up the axis of the lens assembly, as will be explained hereinbelow. In doing so, the operator of the instrument is guided by the spirit levels 18 and 19.

The ends of the camera box are provided with two handles 21 and 22 to facilitate the orienting of the instrument to follow the airplane and maintain the camera sighted on the airplane at all times while pictures are being taken upon the film 9.

In order to enable the camera to be oriented as described, it is supported on a bearing, preferably an anti-friction bearing 23 (see Fig. 10), so that the camera can be rotated on the substantially vertical axis of this bearing, which axis coincides with that of a central spindle 24 that extends up through the bearing and through the bottom wall 25 of the camera box or casing 3 to carry a table 26 that is fixed to it. This table is of substantially circular form and is illustrated in Fig. 2. The spindle 24 carries a base collar 27 that is attached to it by a set screw 27', and this collar rests upon a base plate 28, upon which it is non-rotatably held. This base plate can be adjusted about the front and rear axis 14 and also on a transverse axis by means of four adjusting screws 29 having heads 30 that rest upon the top of a pedestal 31, said pedestal 31 being mounted in the usual manner on the supporting legs 31a (Fig. 2) of a tripod of well known construction. These adjusting screws 29 pass loosely through the base plate 28 and have nuts 32 above and below the plate that can be clamped to the plate to bring it into a position that will hold the axis of the bearing 23 substantially vertical. The connection of shaft 24 with the tripod is of the usual type used for transits and the like, permitting leveling of the camera by adjustment of the screws 29.

The spindle 24, as will now be understood, can be adjustably moved into a position in which the same is substantially vertical so that the camera when it is moved to maintain the aircraft in the field of view of the lens system rotates about a vertical axis coincident with the axis of the spindle. This axis of rotation is normal to the optical axis of the lens system and intersects the same at the second or rear nodal point of the system. As the aircraft, as viewed by the lens system, is optically at infinity, the rear nodal point coincides with the principal point and defines the intersection of the optical axis of the lens system and the transverse axis thereof so that the camera thus is rotatable about the transverse axis of the lens system.

It is well known that a lens system may be rotated about the transverse axis thereof without displacement of the image so that when the camera is rotatably moved to maintain the aircraft within the field of view of the lens system there is no displacement of the image in the image space of the system.

I provide means associated with the apparatus for indicating the oriented position of the axis of the lens assembly at the instant of taking each picture. While various means may be employed employed for accomplishing this, in the present instance I prefer to provide an arcuate screen 33 that may be supported, if desired, in a groove 34 formed on the upper side and near the edge of the table 26 (see Fig. 2).

This screen 33 is of semi-circular form with the axis of its arc coinciding with the axis of the spindle 24, so that when the camera is being swung around to maintain the airplane within the field, the screen will always be located quite close to the light aperture 6, that is, it lies substantially in the focal plane of the lens system (see Fig. 11). This screen is translucent and preferably formed of clear material so that it is actually transparent. It is provided with an orientation-indicating scale with predeterminedly spaced vertical reference lines 35 that are numbered from a zero point at the middle of the arc of the screen, and extend around through substantially 90° toward each end of the screen. Whenever a picture is taken on the film, the vertical lines 35 with their degree numbers such as the degree numbers 65, 70, 75, etc., will be imaged on the film, and when the film is developed they will appear clearly on the film.

In addition to the vertical lines 35, the screen is also preferably provided with predeterminedly spaced horizontal reference lines 36 that form a scale for indicating the elevation of the plane. These horizontal lines 36 would also be numbered consecutively from the lower edge of the scale upwardly, and equidistant from each other so that when the images 37, 38 and 39 appear on successive frames or pictures 40, the position of the image on the picture gives information that enables the vertical component or rise of the plane to be readily computed. This is indicated in Fig. 4, where the camera is supposed to have picked up or started the pictures at the right of the runway while pointed in the general direction indicated by the line 41. In the pictures as shown in Fig. 4, for example, the image 37 is "taken" at an instant when the aperture 6 was opposite the orientation degree line indicating 75°; the next one at 70° and the next one at 65°. Of course, these degree indications stated are merely given as examples because changes in degree of the camera position would depend upon how close the camera was located to the runway. In mounting the camera, of course, the zero position for the axis of the lens assembly would be in line with the axis line or vertical plane passing through the axis line 42, which is at right angles to the direction in which the runway 1 extends. As the screen 33 on which the lines 35 and 36 are formed substantially coincides with the focal plane of the lens system in all positions of the camera as it is moved about the axis of the spindle 24, images of these lines have a predetermined fixed position in the image space of the lens system and consequently on the developed film. The orientation of the image of the airplane with respect to the image of the reference lines can be used to compute or determine the position of the aircraft in the object space of the lens system. As the screen is fixed relative to the lens system and as the latter is swung about the transverse axis thereof passing through the rear nodal point of the system, accurate results can be obtained even though the operator has not been able to maintain the airplane absolutely centered in the field of view of the lens system as the succession of pictures is taken. Thus, if an exposure is made at a time when the image of the aircraft as seen in the view finder is displaced from the center thereof, the resulting image of the aircraft on the film will be displaced a like amount from the center of the picture, but the image of the reference lines coinciding with the image of the plane will nevertheless accurately show the position of the aircraft in the object space of the lens system.

Referring again to Fig. 2, the film 9 is drawn from a supply reel 43 that in the present instance is mounted at the right side of the camera casing 3, and the film passes from this supply reel around a tension roller 44, from which point it passes through a film guide 45 that is located close to the outer side of the screen 33 (see Fig. 11) and is shown as mounted on short posts or bolts 46 that are secured to the inner side of the rear wall 47 of the camera casing.

Referring again to Figure 11, it will be noted that the cover wall 47' of the light tunnel 4 extends rearwardly as far as the rear wall 47, the light aperture 6 being formed in aperture plate 48.

Directly forward of the aperture plate 48 a shutter 49 is provided. This shutter may be of any desired construction but in the present instance it is constructed as illustrated in Figs. 9 and 11. These details will be described more fully later in the specification. At this point, however, it should be stated that this shutter 49 is actuated by shutter shaft 50 that is mounted in a bushing 51. Carried in the bottom wall 52 of the light tunnel 4, this bushing has an enlarged head 53 at its lower portion that can swing to and fro in an arcuate slot 54 which is formed through the table 26. Below the table the shutter shaft 50 carries a rigid shutter arm 55 for rocking this shaft 50 to operate the shutter.

Figure 8:
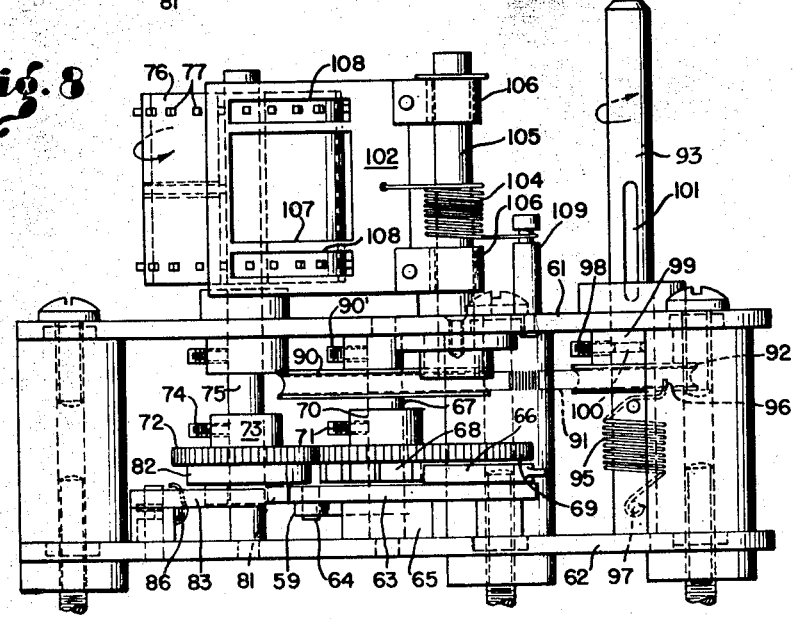
Fig. 8 is a bottom plan view of the film-feed and shutter controlling subcombination shown in Fig. 7, sighting in the direction of the arrows.

The feeding mechanism, of course, may be of any desired construction, but is preferably constructed as illustrated in Figures 7 and 8, in order to enable the feeding mechanism to be actuated through the agency of an electric coil in the electric circuit that is controlled by the timer, all of which will be presently described.

Referring to Figs. 5, 7 and 8, I provide a solenoid 56 including a coil 57 and a core 58, said core being attached to a link 59 that extends over to the feed mechanism 60. This feed mechanism includes an upper frame plate 61 and a lower frame plate 62, between which most of the feed mechanism assembly is located. The rear end of the link 59 is attached to a rocker 63 by pivot pin 64 that projects down from the under side of the rocker (see Fig. 8). This rocker has a hub 65 that is loose on a vertical shaft 67, rotatably mounted between the frame plates 61 and 62.

When the timer device closes the electric circuit through the solenoid coil 57, the link 59 is pulled in the direction of the arrow shown in Fig. 7, and this will give a swinging movement to the rocker 63 in a clock-wise direction, as indicated by the arrow. This rocker carries a pawl 66 mounted on the pivot pin 67' that is in engagement with a ratchet 68 that is rigid with the gear wheel 69, and the gear wheel has a hub 70 (see Fig. 8) that is attached to the shaft 67 by a set screw 71. This gear wheel 69 meshes with a smaller gear wheel or pinion 72, the hub 73 of which is secured by a set screw 74 to another shaft 75 that is also rotatably mounted in the frame plates 61 and 62, and which projects upwardly above the upper plate 61 where it carries a feed roller or sprocket roller 76 that has equi-distant sprocket teeth 77 for engaging the sprocket holes 78 of the film 9. This will exert tension on the film and pull it in the direction of the arrow indicated in Fig. 5, taking film from the supply reel 43 and advancing it past the light aperture 6, where the exposure of the film is made.

The rocker 63 has a long stop arm 79 that swings over toward the left as viewed in Fig. 7 until its inclined end face 80 projects itself into the path of one of four studs 81 that project down from the under side of the hub 82 on the under side of the small gear 72. This will stop the rotation of the shaft 75, but not, however, until the film is advanced through the length of one "frame" or picture. A detent pawl 83 is pivoted at 84 on the lower frame plate 62 to engage the studs 81 in succession to prevent the feed roller 76 from rotating backward. This detent pawl is pulled toward the studs 81 by a coil spring 85 (see Fig. 7) that is anchored to the pawl 83 at the point 86.

When the circuit through the coil 57 is broken, the rocker 63 is pulled back to its position of rest by coil spring 87 (see Fig. 7).

The driving pawl 66 carried by the rocker 63, which rotates the ratchet wheel 68, is held yieldingly in contact with the ratchet wheel 68 by means of a coil spring 88, one end of which is anchored at 89 to the arm 79.

This mechanism includes tensioning means for exerting tension on the film by its take-up reel. For this purpose the shaft 67 is provided with a rigidly attached pulley 90 (see Fig. 8) which is secured to the shaft by a small set screw 90', and this pulley carries a spring belt or tension belt 91 formed of a continuous coil spring disposed in a loop around a tension pulley 92 that is loosely mounted on the shaft 93 that carries the take-up reel 94 onto which the film 9 wraps continuously. The shaft 93 is yieldingly urged to rotate in a direction to do this through the agency of a coil spring 95 that is mounted on this shaft 93 between the frame plates 61 and 62, one end of this spring being anchored at 96 in the under side of the pulley 92, with its other end anchored at 97 to a pin that projects out from the side of the shaft 93. The pulley 92 is supported on the shaft 93 by means of a small set screw 98 mounted in a collar 99, the tip of which runs in a circumferential groove 100 on this shaft. In this way, by reason of the fact that the spring belt 91 continuously rotates the pulley 92 in a clockwise direction, as indicated by the arrow in Fig. 7, the spring 95 will be constantly wound up and exert a torsional force upon the shaft 93. A key 101 on this shaft fits into a keyway on the take-up reel 94 for imparting rotation from the shaft to the reel 94.

Whenever the spring 95 becomes so tight that it cannot be tightened any further, then the spring belt will commence to slip in its groove either on the driving pulley 90 or the driven pulley 92.

In order to insure that the film will be constantly held against the face of the sprocket roller 76, I may provide a presser plate 102 (see Figs. 7 and 8), the outer portion of which is bent into an arc to form a shoe 103 that rests against the side of the sprocket roller, and is yieldingly held against the same by means of a coil spring 104. This spring is carried on a pivot post 105 on which the presser plate 102 is pivoted at the two bearings 106. The body of this presser plate 102 is preferably cut away to form a clearance window 107 that reduces the area of contact between the presser plate and the film, and this plate has slits 108 cut in it near its ends to allow clearance for the sprockets or teeth 77 that engage the film to advance it. The other end of the spring 104 is anchored on a post 109 that projects up from the upper side of the upper bracket plate 61.

In Fig. 5 I illustrate a counter C for counting the pictures that have been taken. This counter is operated automatically by a connecting link c that is attached to the link 59.

Referring now to the construction of the shutter 49 illustrated in Fig. 9, this shutter comprises two shutter members 49a and 49b. These shutters have triangularly formed bodies 110 that are superposed upon each other, and both attached friction-tight on the upper end of the rock shaft 50. The outer portion of the shutter 49a consists of an arc-shaped wing 111 that is slightly wider than the corresponding arc-shaped wing 112 on the shutter member 49b. These two arcuate parts 111 and 112 have two vertical slits or slots 113 and 114 formed in them.

When the rock shaft 50 is actuated, these shutter members oscillate between two stop pins 115 and 116. In the position illustrated in Figs. 9 and 12 the two shutter members have their adjacent side edges in contact with the stop pin 115, and this is the position of rest for the shutter. In this position the two slots 113 and 114 are out of line with each other so that the shutter will prevent light from passing through the light aperture 6.

When the solenoid coil 57 is energized by the electric current passing through it, the arm 55 shown in Fig. 11 will be pulled so as to rotate the shaft 50 in a clockwise direction as viewed in Fig. 9. As the shutter members 49a and 49b are friction-tight on the shaft 50, they will rotate with it until the side edge of the wing 111 adjacent to the pin 116 engages this pin. During this forward movement the shutter slits 113 and 114 are constantly out of register with each other so that no exposure is made on this stroke of the shutter. When the edges adjacent the stop pin 116 strike this pin they will become aligned with each other, and then the slots 113 and 114 will be in register with each other; so when the spring 87 (see Fig. 7) pulls the rocker 63 back to its position of rest, as shown in Fig. 7, the link 59 (see Fig. 5) will rotate the shaft 50 in an anti-clockwise direction which will return it to its position of rest shown in Fig. 9. As the shutter moves in this return movement, the slots 113 and 114 being in register, will make an exposure of the film to light coming through the lens indicated schematically at 117 in Fig. 9.

The oscillating movement of the rock shaft 50 should be ample to insure that the edges of the shutter members will make a good firm contact with the stop pins on each stroke of the shutter. In other words, there is an over-drive through the friction connection to the shutter members.

Any suitable friction connection may be employed for driving the shutter members from the rock shaft 50. In Fig. 11 this is illustrated as including a spacer or disc 118 that may be riveted to the triangular body 110 of the shutter member 49b. This disc is preferably composed of fibre or some other material that will develop friction when clamped between the triangular portions of the upper shutter member 49a and the lower one 49b. This clamping pressure is preferably developed by means of two or more spring washers 119 secured under a head or cap disc 120 as illustrated in Fig. 11.

Referring again to Fig. 1, and particularly to the left-hand portion of this figure, the numeral 121 indicates a conventional timer device which functions to deliver timed impulses to the coil 57. The timer illustrated, includes an electromagnet 122 of fundamental horseshoe type, so that it presents a core bar 123 carrying an electric coil 124, the ends of the bar being extended to form two pole pieces 125 and 126. In the gap between these pole pieces an oscillator 127 is provided in the form of a plate-like bar mounted to oscillate on a pivot pin or shaft 128. When the current is on, these poles 125 and 126 will cause the oscillator (which operates as an armature) to rotate from its position of rest, indicated in Fig. 1, toward a position in which the ends of the oscillator 127 will lie near the poles 125 and 126. Due, however, to the inertia of this oscillator 127, the ends of the oscillator will actually swing past its aligned position with the poles 125 and 126, thereby building up some tensioning force in a hairspring 129. One end of this spring is secured to the shaft 128, and the other end is anchored to a fixed anchor 130. This oscillator 127 carries a pin 131 which, as the oscillator moves to and fro, strikes the end of a switch lever 132. As the oscillator 127 swings to and fro, the pin engages, and passes the tip of the lever 132, which swings the other end of this lever to and fro so as to make contact alternately with two fixed contacts 133 and 134, as it contacts them.

The coil 57 is connected into a relay circuit including a conductor 135 that leads to a relay switch 136, carried on a metal lever 137, biased by spring 137a in a direction to open the switch 136; and another conductor 138 that leads to one side of a source of E. M. F., such as a battery 139.

Beyond the battery a conductor 140 is connected by a short wire 141 to the switch 136. The horseshoe magnet 122 is formed with a rearwardly extending pole 142 which, when energized, attracts the lever armature 137. It is necessary to provide a main switch 143 in the branch circuit that includes the coil 57. This switch is shown near the battery in the conductor 140. Closing this switch will not energize the coil 57 because the circuit will be open at the switch 136.

In order to take the pictures at timed intervals the wiring includes an oscillator circuit employing a conductor 144 that extends from the conductor 138 to the pivot pin or shaft 145 on which the lever 132 is mounted for oscillation, and the end of the lever 132 is provided with contacts 146 and 147 to cooperate with the contacts 133 and 134, to close and open the timing circuit to alternately energize and de-energize the coil 124. One end of coil 124 is connected to the conductor 148, and the other end of the coil is connected to conductor 140 already referred to.

A shunt conductor, including the conductors 149 and 150, is connected at its ends to the conductor 144 and the conductor 148. When a pushbutton switch 151 in this conductor is momentarily closed, it completes a circuit through coil 124 around the lever 132 contacts and this switch is mounted in an accessible position on the exterior of the housing 3 (see Fig. 2). This energizes coil 124, causing pole 142 to attract switch lever 137 which closes the circuit through coil 57 to start the feeding movement for the film.

The push-button switch 151 is necessary because the lever 132 is held normally in the neutral position, or rest position, by coil spring 152, one end of which is anchored to the insulating post 153, and the other end of which is attached to the side of lever 132 in line with its pivot shaft. With this arrangement, the lever 132 is normally held in the neutral or rest position shown in Fig. 1, with the contacts 146, 147 spaced from the respective contacts 133, 134 due to the fact that the end of the spring 152 which is connected to the lever 132 is attached at one side of the shaft 145, and said spring is so arranged that its effective line of force is in a dead center line between the axis of shaft 145 and the post 153 so that the effective pull of said spring on lever 132 maintains said lever in said neutral position when the mechanism is deenergized. When the lever 132 is oscillating the spring 152 always tends to return said lever to this neutral position. For example, should the lever rotate in a clockwise direction the point of attachment of the spring to the lever will similarly rotate out of its aligned position and the spring will therefore tend to pull said lever in a counter-clockwise direction and back to its normal rest position. Similar action will occur when the lever 132 rotates in a counterclockwise direction beyond its neutral position.

Although when this camera apparatus is in use it is freely mounted for orientation at its supporting shaft 24, as a matter of convenience the housing is provided with means for locking it to the stand which supports it. Means for this purpose is illustrated in Fig. 6 and includes a locking pin 154 that is mounted in a guide or bushing 155 attached to the bottom wall 25 of the casing 3. The location for this locking pin is indicated in Fig. 5. The lower end of the pin extends down below a retainer plate 156 on which the pin is supported by its collar 157. On the under side of the fixed table 26 a socket 158 is formed which, if desired, may extend through a socket plate 159 attached to the under side of this table. Of course, this locking pin could be arranged to hold the housing fixed in any desired oriented position, but in practice it would usually be placed so that when the pin 154 is pushed up into the socket, the optical axis of the lens assembly will be in line with the zero point on the scale of the screen or grid 33. The rounded nose of the pin 154 should be friction-tight in the socket 158. Of course, the pin will be held in its withdrawn position by gravity, and hence, there is no danger of the pin accidentally engaging in the socket while the camera is in use.

If desired, tension means may be provided for urging the tension roller 44 toward the left, as viewed in Fig. 5, to maintain the film under proper tension, and also means may be provided for preventing the supply reel 43 from racing. Any suitable well known means may be used to provide such tension for the film and to prevent the reel 43 from racing, and as these means form no part of the invention they are not shown.

I shall now describe briefly the mode of operation of the complete apparatus.

Referring to Fig. 1, the instrument is set up for orientation on its stand or tripod 31a (Fig. 2) in a position such that the optical axis of the objective passes through the zero point of the screen 33 and coincides with the line 42 which is substantially at right angles to the runway 1 along which the airplane is to move in its take-off.

This would be the usual position. However, the direction in which the camera points in the zero position might depend upon circumstances surrounding the particular observations that are to be made. But, under normal conditions, it would be desirable to take the pictures at a starting point on the runway where the "minus" angle of orientation of the camera at the starting point would be substantially equal to the "plus" angle at the opposite point of orientation that the camera would have when the last picture is taken. For example, suppose that the airplane is to start from a position of rest which would necessitate the camera's being swung around to line it up on the line 41. The camera would then be sighted on the airplane so as to line up the vertical hairline 12 of the finder 11 with the middle point of the airplane as viewed through the finder. When everything is in readiness and the plane is about to start, the starting switch 143 would be closed while the switch 151 would be left open. The closing of the switch 151 would pass current from the battery through the coil 124, energizing the poles 125 and 126, which would start the oscillation of the oscillator 127, and at the same time, would energize the pole 142 that would close the relay switch 136. This would pass current through the coil 57 (see Fig. 5), which would draw in the solenoid core 58, and exert a pull on the link 59 and operate the feeding mechanism shown in Fig. 7. This would advance the film through one frame space preparatory to taking the picture, and during this movement the clockwise movement of the rocker plate 63 would exert thrust on the link 59 which would give the shutter device (see Fig. 9) its forward stroke, swinging it in a clockwise direction. In this forward movement of the shutter no exposure is made because the two slots 113 and 114 are out of register. As the shutter arrives at the end of this clockwise movement, the edges of the two shutter members that are adjacent to the stop pin 116 contact with this stop pin, and this lines up the two shutter slots 113 and 114 while the wing portions 111 and 112 of the two shutter members are still holding the light aperture 6 closed.

The oscillation of the lever 132 will, in a short interval of time, open up the circuit at one of the contacts 133 or 134, thereby cutting out the coil 124 which, of course, will de-energize the pole 142, and this opens up the circuit through the coil 57. The spring 87 (see Fig. 7) will then return the rocker 63 to the position in which it is shown in this figure and Fig. 5. This will exert a pull on the link 59, which will give an anticlockwise rotation to the shutter, swinging it back to its position of rest; and in doing this the aligned slots 113 and 114 will effect the exposure of the "frame" of the film that is then located in a fixed position at the light aperture 6.

By adjusting the oscillator spring 129, the period of oscillation can be regulated as desired, so as to take the pictures with any desired time interval between the exposures. While the pictures are being taken, of course the cameraman will maintain the vertical wire 12 of the finder 11 as nearly as possible on the middle point of the airplane, although this is not absolutely necessary because as hereinbefore explained, the position of the image of the airplane with respect to the image of the lines 35 and 36 is, as long as the airplane is in the field of view of the lens system, properly oriented in the image space of the lens system.

As the distance from the camera to the runway is known or determinable, and as the screen 33 will form on the film images of the reference lines 35 and 36 having a predetermined position in the image space of the lens system which will have a correlated position optically in the object space of the lens system, the orientation of the image of the airplane with respect to the images of the reference lines 35 and 36 can be used to determine the position of the airplane in the object space of the lens system. Thus, as the position of the airplane in the object space of the lens system can be determined at each exposure or picture, the progression of the airplane can be determined from a series of positions resolved from the succession of pictures taken at some known or predetermined interval of time.

The exposing of the film can be stopped whenever desired by opening the main switch 143 because this de-energizes the coil 124 and holds it de-energized.

Many other embodiments of the invention may be made without departing from the spirit of the invention.

I claim as my invention:

1. An apparatus for recording the progression of a vehicle moving in a predetermined course of travel comprising: a camera having a lens system; means for mounting said camera at one side of said course for rotation about a predetermined vertical axis; means for taking a succession of pictures of said moving vehicle on a film passed through the camera as the camera is maintained sighted on the moving vehicle; and means for forming in said film as each picture is taken an image of a grid composed of a plurality of horizontally spaced vertical reference lines and a plurality of vertically spaced horizontal reference lines, each of said reference lines having a predetermined, fixed position in the image space of said lens system whereby the position of the image of said vehicle relative to the image of said reference lines on each picture can be used to determine the position of said vehicle in the object space of said lens system at the time each picture was taken, thereby establishing through said succession of pictures a plurality of spaced positions showing the progression of said vehicle.

2. An apparatus for recording the progression of a moving vehicle along a predetermined course of travel comprising: a camera having a lens system; means for mounting the camera for rotation about a predetermined vertical axis; means for taking a succession of pictures of said moving vehicle on a film passed through the camera as the camera is moved about said axis to maintain said vehicle in the field of view of said lens system; and a single translucent index plate bearing a plurality of spaced vertical reference lines and spaced horizontal reference lines and fixed with respect to the mounting means for said camera, said plate lying in the path of external light entering said camera and serving to form in said film as each picture is taken an image of said reference lines; the orientation of the image of said vehicle with respect to the image of said reference lines indicating the position of said vehicle in the object space of said lens system whereby the progression of said vehicle may be determined by said succession of pictures.

3. An apparatus for recording the progression of a vehicle in motion at an optically infinite distance therefrom, comprising: a camera having a lens system; means for mounting the camera for rotation about a vertical axis coincident with the transverse axis of said lens system; means for taking a succession of pictures of said moving vehicle on a film passed through the camera as the camera is horizontally moved to maintain the moving vehicle within the field of view of said lens system; and arcuate means located substantially in the focal plane of said lens system in all positions of said camera and having reference lines thereon whereby at each exposure of said film composite images of said reference lines and vehicle are photographically formed on said film, the orientation of the image of said vehicle with respect to the image of said reference lines indicating the position of said vehicle in the object space of said lens system, whereby the progression of said vehicle along its course can be ascertained from the series of positions determined by the relative positions of the images of each picture of said succession of pictures.

4. An apparatus for recording the performance of a vehicle in motion, comprising: a camera having a lens system; means for mounting the camera for rotation about a predetermined vertical axis intersecting the optical axis of said lens system at the rear nodal point of said system; means for intermittently exposing a film passed through the camera for taking a succession of pictures on said film as the camera is moved about said axis to maintain said vehicle in the field of view of said lens system; and means, including an arcuate, transparent screen having thereon a plurality of predeterminedly spaced reference lines, and held in a position substantially coincident with the focal plane of said lens system in all positions of said camera, for registering on said film at each exposure thereof images of said reference lines having a predetermined position in the image space of said lens system whereby the orientation of the image of said vehicle with respect to the images of said reference lines can be used to determine the position of the vehicle in the object space of said lens system at the time each picture of said succession of pictures was taken and the progression of said vehicle along its course can be resolved from the series of positions ascertained from each picture of said succession of pictures.

5. An apparatus for recording performance of an aircraft in flight, comprising: a camera having a lens system; means for mounting the camera for rotation about a fixed, vertical axis to enable the camera to be horizontally moved to enable the operator thereof to maintain the aircraft within the field of view of said lens system; means for taking a succession of pictures of said aircraft in flight on a film in said camera; a fixed, curved, translucent screen; a plurality of predeterminedly spaced, opaque reference lines on said screen; means for fixedly mounting said screen on said camera with the center of curvature thereof coincident with said fixed, vertical axis, said screen being so disposed relative to the optical axis of said lens system as to be substantially coincident with the focal plane of said system in all positions of said camera so that images of said reference lines are recorded on said film simultaneously with the image of said aircraft at each exposure of said film to form a composite picture in which the orientation of the image of said aircraft with respect to the image of said reference lines can be used to compute the position of said aircraft in the object space of said lens system.

6. An apparatus for recording the performance of an aircraft in flight comprising: a camera, including a lens system, mounted for rotation about the transverse axis of said lens system, said camera being adapted to be horizontally moved to maintain said aircraft in the field of view of said lens system; said camera having a light aperture through which the image of the aircraft is projected by said lens system; a fixed, arcuate, transparent screen disposed substantially around said axis and closely adjacent to the path of the light aperture when the camera is moved about said axis; means for guiding a light-sensitive film past the light aperture and on the other side of the screen from the light aperture so that the screen is interposed between the same; feeding mechanism for advancing the film; a shutter mounted adjacent to said aperture; electro-responsive means for actuating the feeding mechanism; means connecting the said mechanism actuating means with the shutter for actuating the same; and a timing device for actuating the electro-responsive means at known time intervals to actuate the feeding mechanism and the shutter, whereby a succession of pictures of the moving aircraft is imaged upon said film, said screen having a plurality of opaque, predeterminedly spaced intersecting lines thereon, images of which are registered on said film simultaneously with the image of said aircraft, the images of said lines having a predetermined fixed position in the image space of said lens system, whereby the position of said aircraft in the object space of said lens system may be determined from the position of the aircraft relative to the image of said lines on each picture of the succession of pictures taken.

7. An apparatus for recording the progression of a vehicle in motion at an optically infinite distance therefrom, comprising: a camera having a lens system; means for mounting the camera for rotation about a vertical axis coincident with the transverse axis of said lens system; means for taking a succession of pictures of said moving vehicle on a film passed through the camera as the camera is horizontally moved to maintain the moving vehicle within the field of view of said lens system; and a horizontally elongated translucent screen located substantially in the focal plane of said lens system in all positions of said camera and having reference lines thereon whereby at each exposure of said film composite images of said reference lines and vehicle are photographically formed on said film, the orientation of the image of said vehicle with respect to the image of said reference lines indicating the position of said vehicle in the object space of said lens system, whereby the progression of said vehicle along its course can be ascertained from the series of positions determined by the relative positions of the images of each picture of said succession of pictures.

ARTHUR P. NEYHART.

REFERENCES CITED

The following references are of record in the file of this patent:

UNITED STATES PATENTS

| Number | Name | Date |
| --- | --- | --- |
| 212,865 | Muybridge | Mar. 4, 1879 |
| 2,045,414 | Rumpel | June 23, 1936 |
| 2,068,410 | Hanke et al. | Jan. 19, 1937 |
| 2,111,516 | Roux | Mar. 15, 1938 |
| 2,169,011 | Wengel | Aug. 8, 1939 |
| 2,273,876 | Lutz et al. | Feb. 24, 1942 |